(12) United States Patent
Lee

(10) Patent No.: US 11,044,136 B2
(45) Date of Patent: Jun. 22, 2021

(54) METHOD AND APPARATUS FOR ESTIMATING FREQUENCY OFFSET IN WIRELESS COMMUNICATION SYSTEM

(71) Applicant: Samsung Electronics Co., Ltd., Gyeonggi-do (KR)

(72) Inventor: Ikbeom Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 563 days.

(21) Appl. No.: 15/932,458

(22) PCT Filed: Aug. 23, 2016

(86) PCT No.: PCT/KR2016/009297
§ 371 (c)(1),
(2) Date: Feb. 26, 2018

(87) PCT Pub. No.: WO2017/034291
PCT Pub. Date: Mar. 2, 2017

(65) Prior Publication Data
US 2020/0287770 A1    Sep. 10, 2020

(30) Foreign Application Priority Data
Aug. 25, 2015  (KR) .......................... 10-2015-0119432

(51) Int. Cl.
H04L 27/26        (2006.01)
H04W 88/08       (2009.01)

(52) U.S. Cl.
CPC ...... *H04L 27/2678* (2013.01); *H04L 27/2672* (2013.01); *H04W 88/08* (2013.01)

(58) Field of Classification Search
CPC . H04L 27/2678; H04L 27/2672; H04W 88/08
(Continued)

(56) References Cited

U.S. PATENT DOCUMENTS 6,788,752 B1   9/2004  Andre
2005/0068886 A1*  3/2005  Wang .................. H04L 27/2607
                                                                  370/210

(Continued)

FOREIGN PATENT DOCUMENTS

CN   1917491   2/2007
CN   102118348  7/2011

(Continued)

OTHER PUBLICATIONS

PCT/ISA/210 Search Report issued on PCT/KR2016/009297 (pp. 3).

(Continued)

*Primary Examiner* — Hirdepal Singh
(74) *Attorney, Agent, or Firm* — The Farrell Law Firm, P.C.

(57) ABSTRACT

Disclosed are a method and an apparatus for estimating a frequency offset in a wireless communication system. The method for estimating a frequency offset of the present disclosure comprises the steps of: acquiring a first symbol from which a cyclic prefix (CP) symbol of a received symbol is removed; acquiring a second symbol from which data having a length corresponding to a length of CP is removed at an end opposite to the end in which the CP is present in the received symbol; and estimating the frequency offset by using the first symbol and the second symbol.

15 Claims, 12 Drawing Sheets

(58) Field of Classification Search
USPC .......................................................... 375/222
See application file for complete search history.

(56) References Cited

U.S. PATENT DOCUMENTS

| | | | |
|---|---|---|---|
| 2009/0003423 A1 | 1/2009 | Oh et al. | |
| 2009/0154613 A1 | 6/2009 | Lai | |
| 2010/0128808 A1 | 5/2010 | Ro | |
| 2011/0142145 A1 | 6/2011 | Hwang et al. | |
| 2012/0057872 A1 | 3/2012 | Freda et al. | |
| 2012/0178448 A1 | 7/2012 | Yuk et al. | |
| 2012/0287874 A1* | 11/2012 | Oketani | H04L 27/2657 370/329 |
| 2013/0021976 A1* | 1/2013 | Yang | H04L 27/2663 370/328 |
| 2014/0247743 A1 | 9/2014 | Seo | |
| 2014/0286468 A1* | 9/2014 | Lee | H04L 27/2656 375/371 |
| 2015/0031367 A1 | 1/2015 | Singh et al. | |
| 2015/0172010 A1* | 6/2015 | Gaspar | H04L 27/2605 375/295 |
| 2015/0372843 A1* | 12/2015 | Bala | H04L 27/2649 375/295 |
| 2016/0337998 A1 | 11/2016 | Kim | |
| 2017/0201405 A1* | 7/2017 | Huang | H04L 27/266 |
| 2017/0331664 A1 | 11/2017 | Cheon et al. | |

FOREIGN PATENT DOCUMENTS

| | | |
|---|---|---|
| CN | 104092636 | 10/2014 |
| KR | 1020070071604 | 7/2007 |
| KR | 1020070111673 | 11/2007 |
| KR | 1020100077984 | 7/2010 |
| KR | 1020100092597 | 8/2010 |
| KR | 1020110084668 | 7/2011 |
| KR | 1020150072983 | 6/2015 |

OTHER PUBLICATIONS

PCT/ISA/237 Written Opinion issued on PCT/KR2016/009297 (pp. 8).
Hua Zhou et al., "A Novel Carrier Frequency Offset Estimation Method for IEEE 802.16E System", IEEE Global Telecommunications Conference, Nov. 1, 2007, 5 pages.
Hanli Zou et al., "An Integrated OFDM Receiver for High-Speed Mobile Data Communications", IEEE Global Telecommunications Conference, Nov. 25, 2001, 5 pages.
European Search Report dated Jun. 7, 2018 issued in counterpart application No. 16828011.3-1215, 8 pages.
European Search Report dated Jun. 12, 2018 issued in counterpart application No. 16839580.4-1231, 9 pages.
Chinese Office Action dated May 27, 2020 issued in counterpart application No. 201680048845.5, 14 pages.
Indian Examination Report dated Feb. 9, 2021 issued in counterpart application No. 201817006976, 7 pages.
Chinese Office Action dated Feb. 9, 2021 issued in counterpart application No. 201680048845.5, 9 pages.

* cited by examiner

METHOD AND APPARATUS FOR ESTIMATING FREQUENCY OFFSET IN WIRELESS COMMUNICATION SYSTEM

PRIORITY

This application is a National Phase Entry of PCT International Application No. PCT/KR2016/009297 which was filed on Aug. 23, 2016, and claims priority to Korean Patent Application No. 10-2015-0119432, which was filed on Aug. 25, 2015, the content of each of which is incorporated herein by reference.

TECHNICAL FIELD

Various embodiments of the present disclosure relate to a wireless communication system, and more particularly, to a base station and a method for estimating a frequency offset thereof.

BACKGROUND ART

Generally, mobile communication systems have been developed to provide a voice service while securing activity of a user. However, the mobile communication system gradually extends an area from a voice service to a data service. At present, the mobile communication system has been developed to provide a high-speed data service. However, since the current mobile communication systems that are providing services suffers from a resource shortage phenomenon and do not meet a user demand for higher-speed services, there is a need for a more developed mobile communication system.

To meet the requirement, standardizations for long term evolution (LTE) in the 3rd generation partnership project (3GPP) as one system that is being developed as next-generation mobile communication systems are in progress. The LTE is a technology of implementing fast packet based communication having a transmission rate up to 100 Mbps or so, with aiming to commercialize around 2010. For this purpose, several schemes have been discussed. For example, there are a scheme of reducing the number of nodes positioned on a communication path by simplifying, for example, network architecture, a scheme of approaching radio protocols to a radio channel to the extent possible, and so on.

Meanwhile, in an uplink system of an OFDM wireless communication system, one OFDM symbol received by a base station includes signals received from a plurality of terminals communicating with the base station. A frequency offset may occur between the base station and the terminal communicating with the base station depending on a location change caused by movement of the terminal or a change in the surrounding environment. In addition, interference between the terminals, that is, interference between subcarriers is present in OFDM symbols received by the base station. The frequency offset and the interference cause a problem of deteriorating the reception performance of the base station.

Accordingly, in the LTE uplink system, the base station has to estimate the frequency offset between the base station and the terminal.

DISCLOSURE OF INVENTION

Technical Problem

An object of the present disclosure is directed to provision of a base station and a method for estimating a frequency offset thereof capable of easily estimating a frequency offset with a small computation using a cyclic prefix (CP).

Solution to Problem

Various embodiments of the present disclosure are directed to the provision of a method for estimating a frequency offset of a base station including: acquiring a first symbol from which a cyclic prefix (CP) symbol of a received symbol is removed; acquiring a second symbol from which data having a length corresponding to the CP symbol is removed at an end opposite to an end in which the CP symbol is present in the received symbol; and estimating the frequency offset using the first symbol and the second symbol.

The first symbol and the second symbol may be acquired from the symbol of the data signal received by the base station.

The estimating of the frequency offset may further include: setting the remaining data symbols other than the CP symbol of the second symbol to be 0 if the first symbol and the second symbol are acquired from a symbol of a data signal; and estimating the frequency offset using the first symbol and the second symbol in which the remaining data symbols other than the CP symbol is set to be 0.

The estimating of the frequency offset may further include: performing fast Fourier transform (FFT) on the first symbol and the second symbol; and performing time offset compensation on at least one of an output acquired by performing the FFT on the first symbol and an output acquired by performing the FFT on the second symbol.

The estimating of the frequency offset may further include: calculating a correlation between an output result acquired by performing the time offset compensation and an output result acquired by not performing the time offset compensation; accumulating the calculated correlation; and estimating the frequency offset using the accumulated correlation.

The estimating of the frequency offset may further include: performing fast Fourier transform (FFT) on the first symbol and the second symbol; performing time offset compensation on at least one of an output acquired by performing the FFT on the first symbol and an output acquired by performing the FFT on the second symbol; removing noise by performing channel estimation on the outputs acquired by performing or not performing the time offset compensation if the first symbol and the second symbol are symbols acquired from a reference signal (RS) received by the base station; and calculating the correlation of the output results of the first symbol and the second symbol from which the noise is removed; accumulating the calculated correlation; and estimating the frequency offset using the accumulated correlation.

Various embodiments of the present disclosure are directed to the provision of a base station including: a transceiver configured to transmit/receive a symbol; a symbol acquirer configured to acquire a first symbol from which a cyclic prefix (CP) symbol of a received symbol received through the transceiver is removed and acquire a second symbol from which data having a length corresponding to the CP is removed at an end opposite to an end in which the CP is present in the received symbol; and frequency offset estimator configured to estimating the frequency offset using the first symbol and the second symbol.

The symbol acquirer may acquire the first symbol and the second symbol from a symbol of a data signal received through the transceiver The frequency offset estimator may set the remaining data symbols other than a CP symbol of the second symbol to be 0 if the first symbol and the second symbol are acquired from the symbol of the data signal and estimate the frequency offset using the first symbol and the second symbol in which the remaining data symbols other than the CP symbol are set to be 0.

The frequency offset estimator may further include: a converter configured to perform fast Fourier transform (FFT) on the first symbol and the second symbol; and a compensator configured to perform time offset compensation on at least one of an output acquired by performing the FFT on the first symbol and an output acquired by performing the FFT on the second symbol.

The frequency offset estimator may further include: a correlation calculator configured to calculate a correlation between an output result acquired by performing the time offset compensation and an output result acquired by not performing the time offset compensation; and an accumulator configured to accumulate the calculated correlation, wherein the offset estimator estimates the frequency offset using the accumulated correlation.

The base station may further include: a converter configured to perform fast Fourier transform (FFT) on the first symbol and the second symbol; a compensator configured to perform time offset compensation on at least one of an output acquired by performing the FFT on the first symbol and an output acquired by performing the FFT on the second symbol; a channel estimator configured to remove noise by performing channel estimation on the outputs acquired by performing or not performing the time offset compensation if the first symbol and the second symbol are symbols acquired from a reference signal (RS) received by the base station; a correlation calculator configured to calculate the correlation between the output results of the first symbol and the second symbol from which the noise is removed; and an accumulator configured to accumulate the calculated correlation, wherein the offset estimator may estimate the frequency offset using the accumulated correlation.

Advantageous Effects of Invention

According to the embodiment of the present disclosure, the base station can easily estimate the frequency offset using the cyclic prefix (CP) so that the orthogonality between frequencies is ensured even with the small amount of computations.

MODE FOR THE INVENTION

Figure 1:
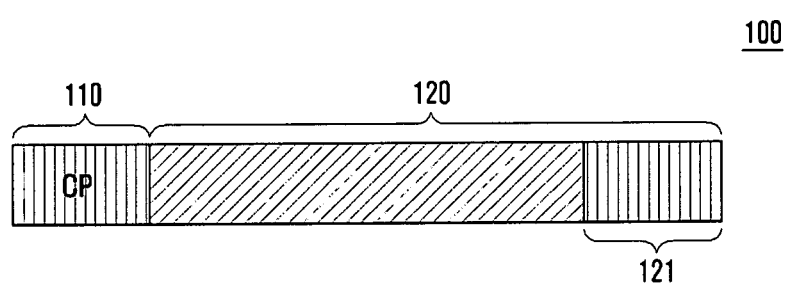
FIG. 1 is a diagram showing a structure of a symbol in a time domain.

Hereinafter, exemplary embodiments of the present disclosure will be described in detail with reference to the accompanying drawings. At this time, it is noted that like reference numerals denote like elements in appreciating the drawings. Moreover, detailed descriptions related to well-known functions or configurations will be ruled out in order not to unnecessarily obscure the subject matter of the present disclosure.

Further, in describing in detail embodiments of the present disclosure, an advanced E-UTRA (or referred to as LTE-A) system supporting a carrier aggregation will be mainly described. However, a main subject of the present disclosure may be slightly changed to be applied to other communication systems having similar technical backgrounds and channel forms without greatly departing the scope of the present disclosure, which may be determined by those skilled in the art to which the present disclosure pertains. For example, a main subject of the present disclosure may also be applied even to a multicarrier HSPA supporting the carrier aggregation.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

Further, it may be understood that each block of processing flow charts and combinations of flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are contiguously illustrated may be simultaneously performed in fact or be performed in a reverse sequence depending on corresponding functions sometimes.

Here, the term '~unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may further be separated into additional components and '~units'. In addition, the components and the '~units' may also be implemented to reproduce one or more CPUs within a device or a security multimedia card.

FIG. 1 is a diagram showing a structure of a symbol 100 in a time domain.

As shown in FIG. 1, the symbol 100 includes a cyclic prefix (CP). The cyclic prefix (CP) 110 is introduced to remove adjacent symbol interference in an OFDM based wireless communication system. The cyclic prefix (CP) 110 added to each OFDM symbol may prevent or alleviate a shock due to multi-path fading.

The cyclic prefix (CP) 110 may be formed in one symbol 100 using data which is included in an end in time. Specifically, the cyclic prefix (CP) 110 may be formed by copying data having a predetermined length which is included in the end in time on the symbol 100 and inserting the copied data into an end opposite to the end.

On the other hand, the longer the length in time in the cyclic prefix (CP) 110, the more advantageous in a relatively larger cell. The LTE system can support either a normal cyclic prefix or an extended cyclic prefix. The normal cyclic prefix is designed for a small and medium sized cell in which a delay spread of a reflected wave is small in time, and the extended cyclic prefix is designed for a large cell in which the delay spread of the reflected wave is large in time.

Hereinafter, a symbol 100 as shown in FIG. 1 is defined as including a cyclic prefix (CP) symbol 110 and a data symbol 120, and a concrete description thereof will be given.

As described above, in the data symbol 120 included in the symbol 100, the same data as that of the cyclic prefix (CP) symbol 110 is present at the end opposite to the end in which the CP symbol 110 is present.

According to an embodiment of the present disclosure, as shown in FIG. 1, the base station can estimate the frequency offset between the base station and the terminal using the symbol 100 into which the CP symbol 110 is inserted.

Figure 2A:
FIGS. 2A and 2B are diagrams showing first and second symbols for estimating a frequency offset according to an embodiment of the present disclosure.
Figure 2B:
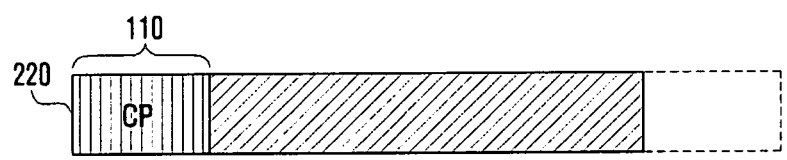

Specifically, FIGS. 2A and 2B illustrate first and second symbols for estimating a frequency offset according to the embodiment of the present disclosure; As illustrated in FIG. 2A, the base station may acquire a first symbol 210 from which the cyclic prefix (CP) symbol 110 of the received symbol 100 is removed. As shown in FIG. 2B, a second symbol 220 from which data having a length corresponding to the cyclic prefix (CP) symbol 110 is removed may be acquired at the end opposite to the end in which the cyclic prefix (CP) symbol 110 of the received symbol 100 is present. The base station may estimate the frequency offset using the acquired first symbol 210 and second symbol 220.

Figure 3:
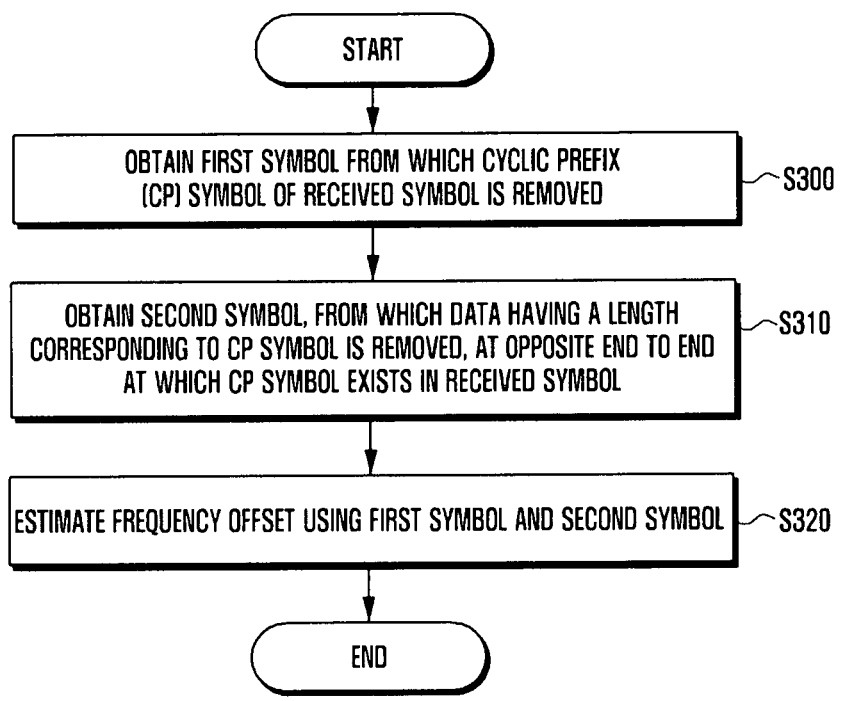
FIG. 3 is a flow chart of a method for estimating a frequency offset according to another embodiment of the present disclosure.
Figure 4:
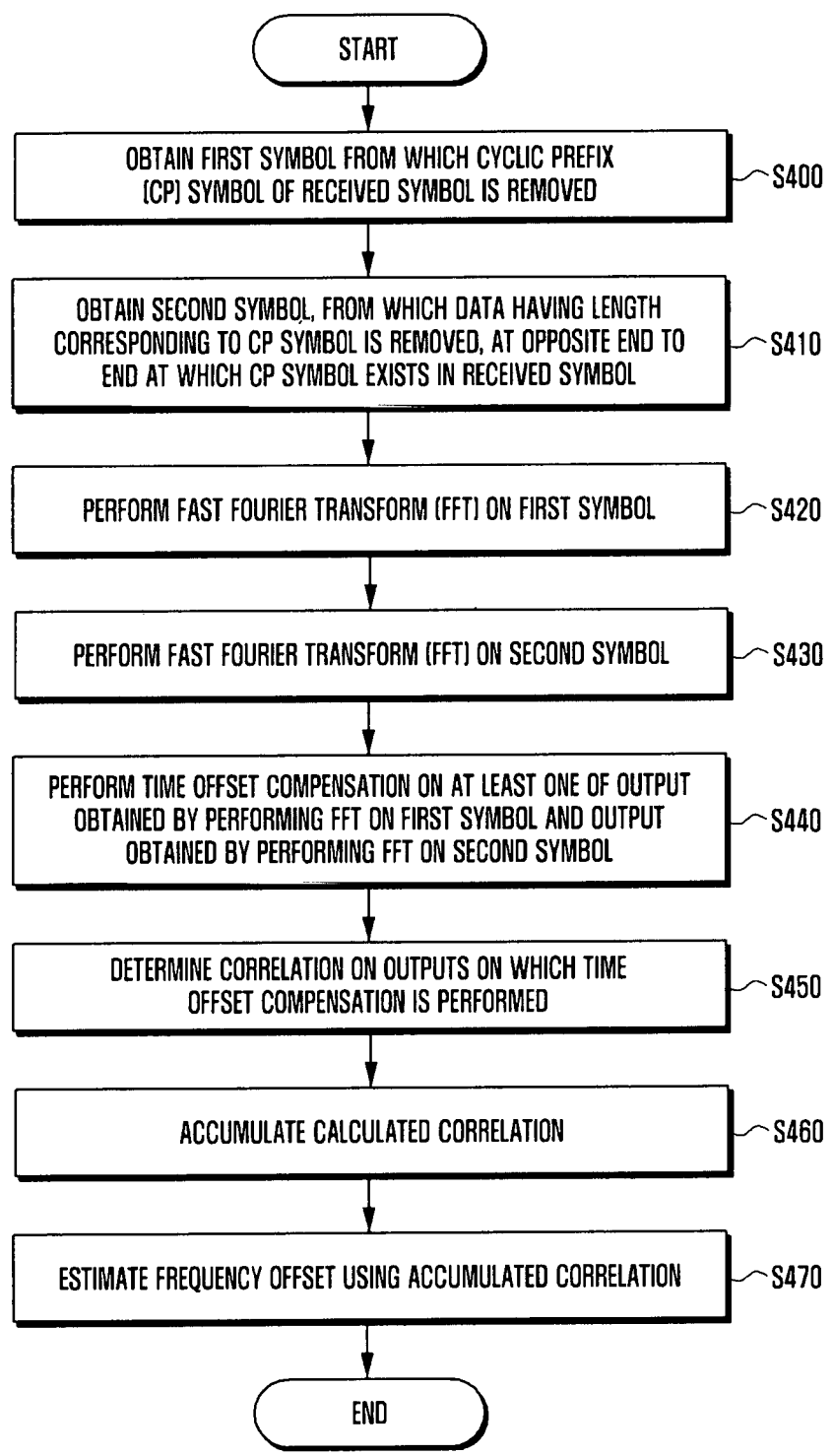
FIG. 4 is a flow chart showing in detail a method for estimating a frequency offset using a symbol of a data signal according to an embodiment of the present disclosure.

Hereinafter, a method for estimating a frequency offset of a base station using the first symbol 210 and the second symbol 220 will be described with reference to FIGS. 3 and 4.

First of all, in step 300, the base station acquires the first symbol from which the cyclic prefix (CP) symbol of the received symbol is removed. In step S310, the base station acquires the second symbol, from which the data corresponding to the cyclic prefix (CP) symbol is removed at the end opposite to the end in which the cyclic prefix (CP) symbol of the received symbol is present.

As described above, since the cyclic prefix (CP) symbol copies data having a predetermined length included in the end of the received symbol in time and inserts the copied data, the data included in the end opposite to the end in which the cyclic prefix (CP) of the received symbol is present is the same as that of the cyclic prefix (CP) symbol.

In step S320, the base station estimates the frequency offset using the acquired first symbol and second symbol.

Meanwhile, the base station may acquire the first symbol and the second symbol from the symbol of the received data signal. The concrete method for estimating a frequency offset of a base station using the symbol of the data signal is as shown in FIG. 4.

First of all, in step 400, the base station acquires the first symbol in which the cyclic prefix (CP) symbol of the received symbol is removed. In step S410, the base station acquires the second symbol, from which the data corresponding to the cyclic prefix (CP) symbol is removed at the end opposite to the end in which the cyclic prefix (CP) symbol of the received symbol is present.

In step S420, the base station performs a fast Fourier transform (FFT) on the acquired first symbol. In step S430, the base station performs a fast Fourier transform (FFT) on the acquired second symbol.

The acquired first symbol is a state in which the cyclic prefix (CP) symbol is removed. The acquired second symbol is a state in which data having a length corresponding to the cyclic prefix (CP) symbol is removed at the end opposite to the end in which the cyclic prefix (CP) symbol is present. Therefore, since the second symbol is ahead of the first symbol by the length of the cyclic prefix (CP) symbol in time, the base station needs to compensate for a time offset.

In step S440, the base station performs time offset compensation on at least one of an output acquired by performing the FFT on the first symbol and an output acquired by performing the FFT on the second symbol. For example, the base station may perform the time offset compensation only on the output acquired by performing the FFT on the first symbol or the output acquired by performing the FFT on the second symbol. In addition, the base station may perform the time offset compensation on the outputs acquired by performing the FFT on the first symbol and the second symbol. By performing the time offset compensation as described above, the base station may prevent a phase difference of the outputs acquired by performing the FFT on the first symbol and the second symbol from occurring.

In step S450, the base station calculates a correlation between the outputs on which the time offset compensation is performed. If the base station performs the time offset compensation on only one output among the outputs acquired by performing the FFT on the first symbol and the second symbol, the base station may also calculate the correlation between the output acquired by performing the time offset compensation and the output acquired by not performing the time offset compensation.

In step S460, the base station accumulates the calculated correlation, and in step S470, the frequency offset is estimated using the accumulated correlation.

For example, as described above, the operation of performing fast Fourier transform by acquiring the first symbol and the second symbol, the operation of performing the time offset compensation on the result acquired by performing fast Fourier transform, or the like may be performed in the frequency domain. Therefore, the above operations may be performed in each allocated resource block (RB) and may be performed in units of subcarrier. SIMO may be performed on a reference signal symbol (RS symbol) and a data symbol. Therefore, the correlation values calculated by the above-described method may be accumulated in each tone and symbol. The base station may calculate a phase at the accumulated correlation value and may calculate back the frequency offset at the calculated phase.

Meanwhile, according to another embodiment of the present disclosure, when the first symbol and the second symbol are acquired from the symbol of the received data signal, the base station may set the remaining data symbols other than the cyclic prefix (CP) symbol of the second symbol to be 0. The base station can estimate the frequency offset using the first symbol and the second symbol in which the remaining data symbols other than the cyclic prefix (CP) symbol are set to be 0.

Figure 5:
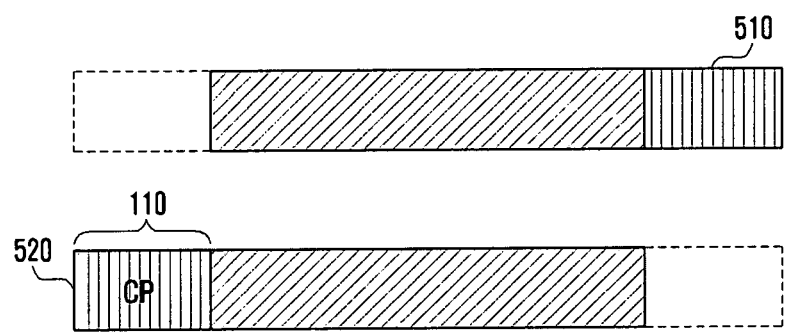
FIG. 5 is a diagram showing a symbol from which a cyclic prefix (CP) symbol is removed and a symbol in which data symbols other than the cyclic prefix (CP) symbol is set to be 0.

FIG. 5 is a diagram illustrating a first symbol 510 from which the cyclic prefix (CP) symbol 110 is removed and a second symbol 520 in which the remaining data symbols other than the cyclic prefix (CP) are set to be 0.

As illustrated in FIG. 5, the base station may perform the fast Fourier transform (FFT) on each of the first symbol 510 and the second symbol 520 in which the remaining data symbols other than the cyclic prefix (CP) symbol is set to be 0. The base station performs the time offset compensation on at least one of the first symbol 510 on which the FFT is performed and the second symbol 520 in which the data symbol is set to be 0. For example, the base station may perform the time offset compensation only on the output acquired by performing the FFT on the first symbol 510 or the time offset compensation only on the output acquired by performing the FFT on the second symbol 520 in which the data symbol is set to be 0. In addition, the base station may perform the time offset compensation on all the outputs acquired by performing the FFT on the first symbol 510 and the second symbol 520 in which the data symbol is set to be 0.

The base station calculates a correlation between the outputs on which the time offset compensation is performed. If the time offset compensation is performed on only one output among the outputs acquired by performing the FFT on the first symbol 510 and the second symbol 520 in which the data symbol is set to be 0, the base station may also calculate the correlation between the output acquired by performing the time offset compensation and the output acquired by not performing the time offset compensation. The base station may accumulate the calculated correlation and estimate the frequency offset using the accumulated correlation.

Figure 6:
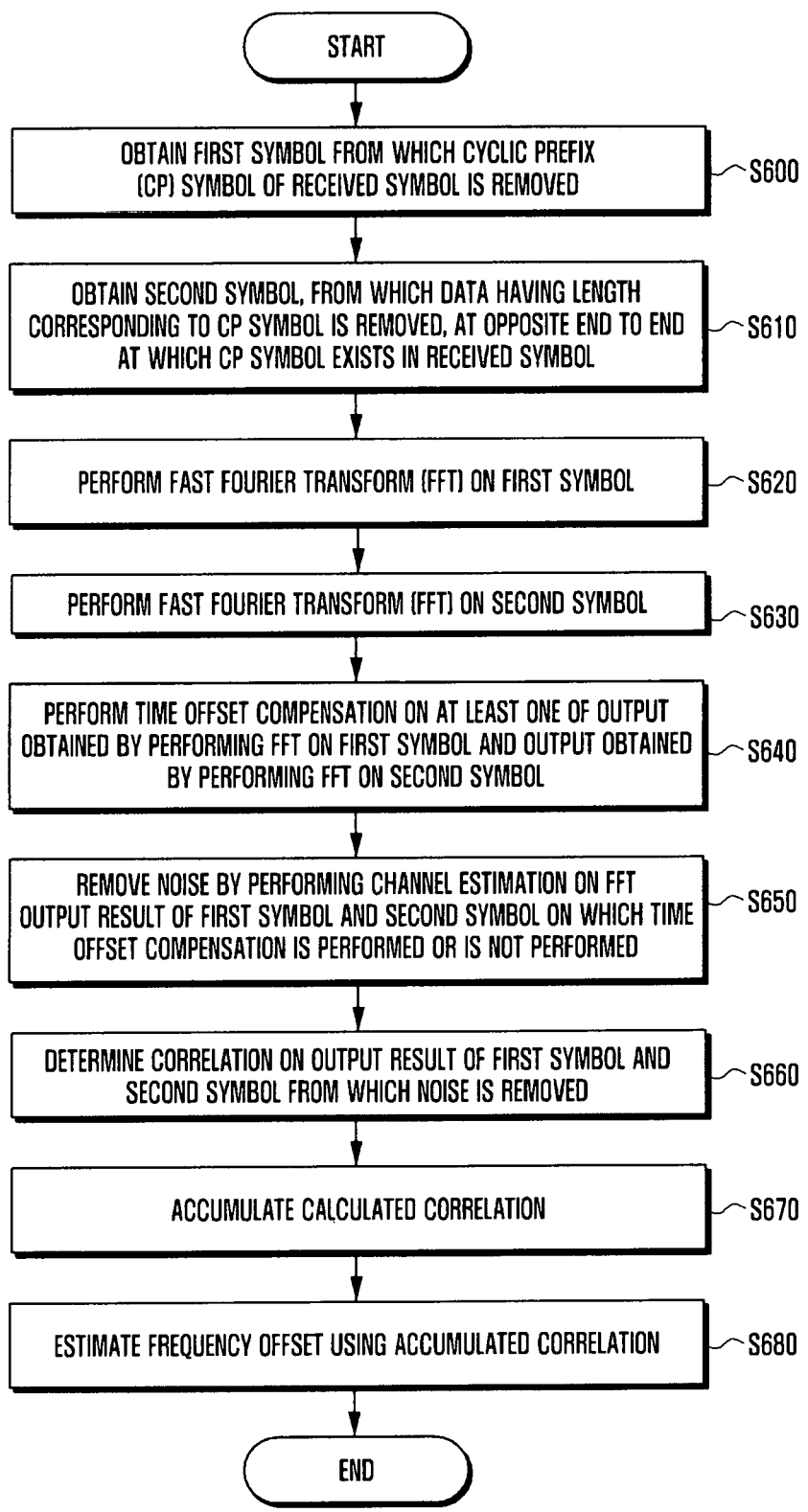
FIG. 6 is a flow chart showing in detail the method for estimating a frequency offset using a symbol of a reference symbol according to an embodiment of the present disclosure.

Meanwhile, FIG. 6 is a flowchart illustrating in detail a method for estimating a frequency offset of a base station using a symbol of a reference signal (RS) according to an embodiment of the present disclosure. Since the cyclic prefix (CP) is inserted into even the symbol of the reference signal, the base station can estimate the frequency offset using the symbol of the reference signal, even when the received signal is not only the data signal but also the reference signal.

First of all, in step 600, the base station acquires the first symbol from which the cyclic prefix (CP) symbol of the symbol of the received reference signal is removed. In step S610, the base station acquires the second symbol, from which the data corresponding to the cyclic prefix (CP) symbol is removed at the end opposite to the end in which the cyclic prefix (CP) symbol of the symbol of the received reference signal is present.

In step S620, the base station performs a fast Fourier transform (FFT) on the acquired first symbol. In step S630, the base station performs a fast Fourier transform (FFT) on the acquired second symbol.

The acquired first symbol is a state in which the cyclic prefix (CP) symbol is removed. Therefore, since the second symbol is ahead of the first symbol by the length of the cyclic prefix (CP) symbol in time, the base station needs to compensate for a time offset.

In step S640, the base station performs time offset compensation on at least one of an output acquired by performing the FFT on the first symbol and an output acquired by performing the FFT on the second symbol. For example, the base station may perform the time offset compensation only on the output acquired by performing the FFT on the first symbol or the output acquired by performing the FFT on the second symbol. In addition, the base station may perform the time offset compensation on the outputs acquired by performing the FFT on the first symbol and the second symbol. By performing the time offset compensation as described above, the base station may prevent a phase difference of the outputs acquired by performing the FFT on the first symbol and the second symbol from occurring.

In step S650, the base station performs the channel estimation on the output acquired by performing the FFT on the first symbol and the second symbol to remove noise.

In step S650, the reason why the channel may be estimated in step S650 will be described. According to the present disclosure, since the characteristics of the LTE uplink signal are maintained, it is possible to perform the accurate channel estimation for the symbol of the reference signal. The first symbol is generally required to demodulate the data. Therefore, according to the embodiment of the present disclosure, the channel estimation is additionally performed on the second symbol.

The noise and interference may be removed by the channel estimation. Therefore, if the base station calculates the correlation between the output's on which the time offset compensation is performed in step S660, the accuracy of the correlation calculated by the channel estimation becomes is increased.

If the base station performs the time offset compensation on only one output among the outputs acquired by performing the FFT on the first symbol and the second symbol, the base station may also calculate the correlation between the output acquired by performing the time offset compensation and the output acquired by not performing the time offset compensation. In step S670, the base station accumulates the calculated correlation, and in step S680, the frequency offset is estimated using the accumulated correlation.

For example, as described above, the operation of performing fast Fourier transform by acquiring the first symbol and the second symbol and performing the time offset compensation on the result acquired by performing fast Fourier transform, or the like may be performed in the frequency domain. Therefore, the above operations may each be performed in allocated resource blocks (RB) and may be performed in units of subcarrier. SIMO may be performed on a reference signal symbol (RS symbol) and a data symbol. Therefore, the correlation values calculated by the above-described method may be accumulated in each tone and symbol. The base station may calculate a phase at the accumulated correlation value and may calculate back the frequency offset at the calculated phase.

FIGS. 7A to 7E are block diagrams illustrating the base station for performing the frequency offset estimation by the above-mentioned method or components of a model included in the base station.

Figure 7A:
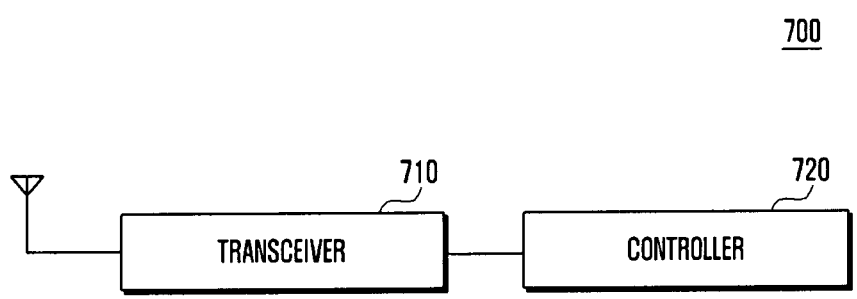
FIGS. 7A to 7E are block diagrams showing a base station or a component of a modem included in the base station according to an embodiment of the present disclosure.

As shown in FIG. 7A, a base station 700 may include a transceiver 710 for transmitting/receiving a symbol and a controller 720 for controlling the base station 700 as a whole.

The transceiver 710 may transmit and receive a signal. The base station 700 can transmit and receive signals to and from electronic devices or other base stations via the transceiver 710.

The controller 720 may control the base station 700 as a whole. The controller 720 may estimate the frequency offset using the first symbol from which the cyclic prefix (CP) symbol of the received symbol received through the transceiver 710 is removed, and the second symbol from which the data having a length corresponding to the CP of the received symbol is removed at the end opposite to the end in which the CP of the received symbol is present.

The first symbol and the second symbol may be the symbol acquired from the symbol of the data signal. When the first symbol and the second symbol are acquired from the symbol of the data signal, the controller 720 may set the remaining data symbols other than the CP symbol of the second symbol to be 0, and output the frequency offset using the first symbol and the second symbol in which the remaining data symbol other than the CP symbol is set to be 0.

Figure 7B:
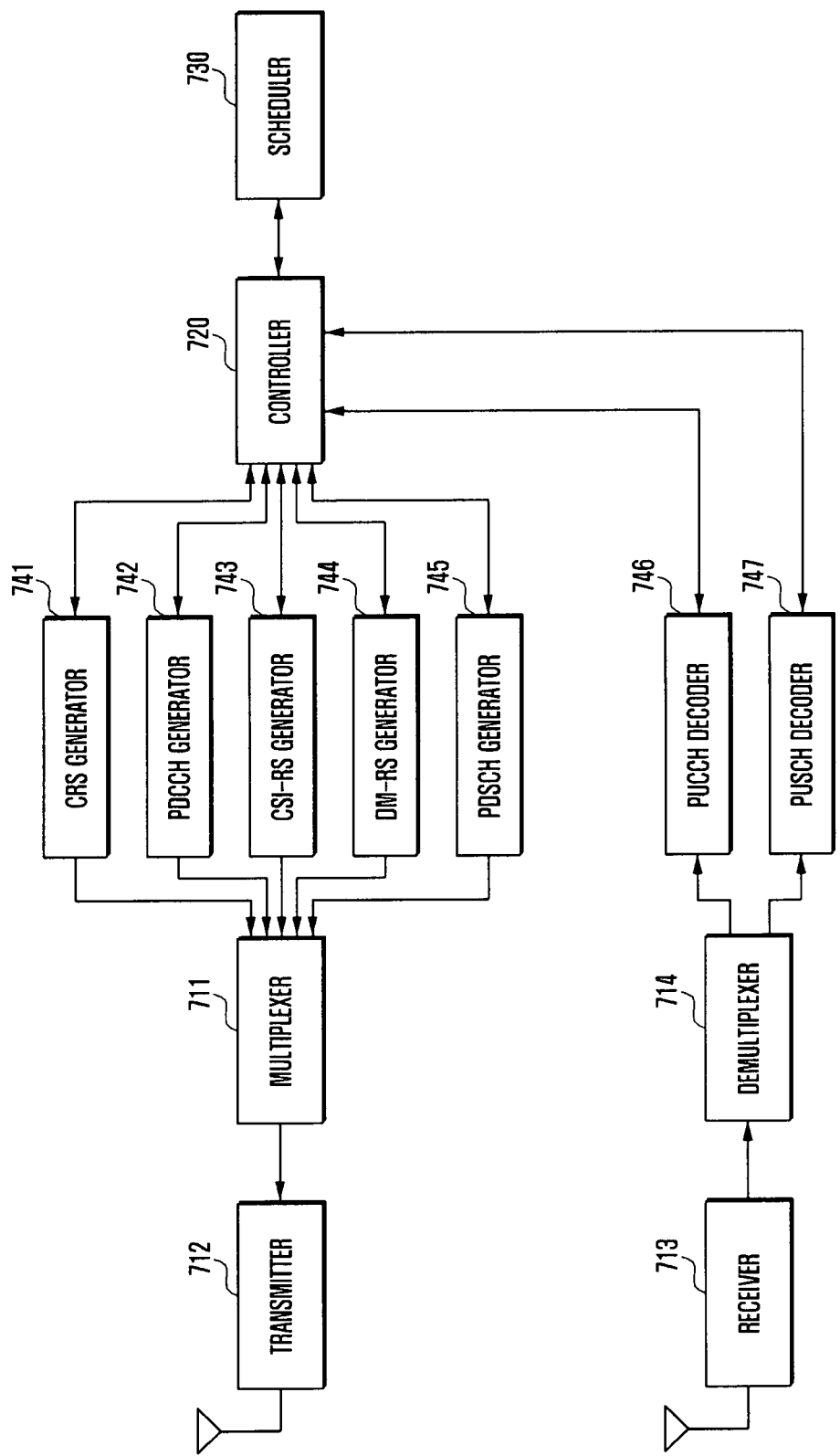

FIG. 7B is a block diagram showing in detail a configuration of the base station 700.

The base station 700 may further include a scheduler 730. The scheduler 730 may determine to which terminal a PDCCH is transmitted to allocate a downlink resource and allocate priority to each terminal. The scheduler 730 performs the task based on channel status information reported by each terminal.

The controller 720 may control the operation of each of other devices based on the determination of the scheduler 730. In detail, the controller 720 may further include blocks of a CRS generator 741, a PDCCH generator 742, a CSI-RS generator 743, a DM-RS generator 744, and a PDSCH generator 745. Therefore, the controller 720 may generate subcarrier symbols of CS, PDCCH, CSI-RS, demodulation-reference signal (DM-RS), PDSCH channels through the blocks of the CRS generator 741, the PDCCH generator 742, the CSI-RS generator 743, the DM-RS generator 744, and the PDSCH generator 745. The subcarrier symbols thus generated may be multiplexed by the multiplexer 711 and transmitted to the terminal by the transmission process of the transmitter 712.

In addition, the received signal is converted into a baseband signal through a receiving process of a receiver 713, and may be divided into PUCCH and PUSCH signals through a demultiplexer 714. The received PUCCH and PUSCH signals may each be decoded by a PUCCH decoder 746 and a PUSCH decoder 747, respectively. The controller 720 may acquire a symbol from the decoded data signal or the control signal.

Figure 7C:
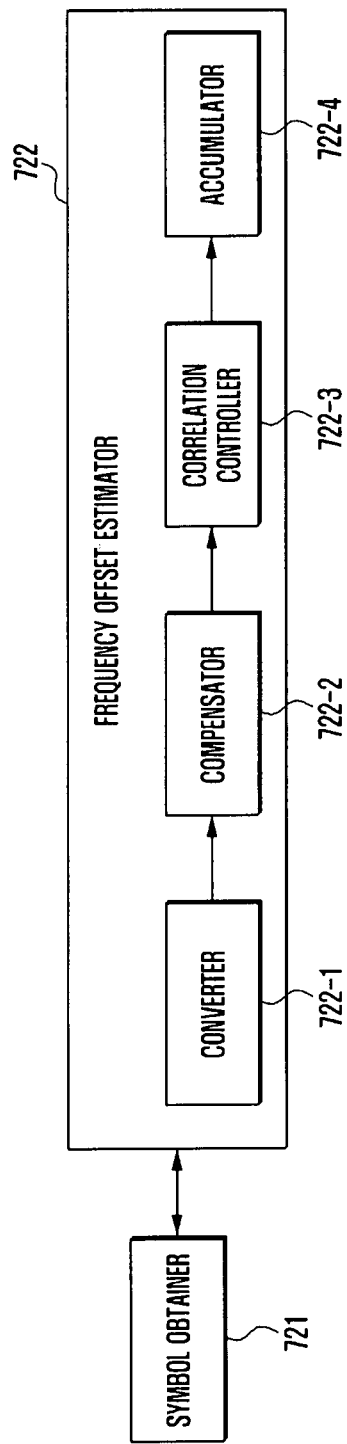

Meanwhile, the controller 720 may further include components as shown in FIG. 7C.

A symbol acquirer 721 is a component for acquiring a symbol. For example, the symbol acquirer 721 may acquire the first symbol from which the cyclic prefix (CP) symbol of the received symbol received through the transceiver 710 is removed, and the second symbol from which the data having a length corresponding to the CP of the received symbol is removed at the end opposite to the end in which the CP of the received symbol is present.

The symbol acquirer 721 may acquire the first symbol and the second symbol from the symbol of the data signal or the symbol of the reference signal which is received through the transceiver 710.

The frequency offset estimator 722 may estimate the frequency offset using the first symbol and the second symbol acquired through the symbol acquirer 721.

According to the embodiment of the present disclosure, if the symbol acquirer 721 acquires the first symbol and the second symbol from the symbol of the data signal, the frequency offset estimator 722 may set the remaining data symbols other than the CP symbol of the second symbol to be 0, and estimate the frequency offset using the first symbol and the second symbol in which the remaining data symbol other than the CP symbol is set to be 0.

Specifically, the frequency offset estimator 722 may include a converter 722-1, a compensator 722-2, a correlation calculator 722-3, and an accumulator 722-4.

The converter 722-1 may perform the fast Fourier transform (FFT) on the first symbol and the second symbol. The compensator 722-2 may perform the time offset compensation on at least one of an output acquired by performing the FFT on the first symbol and an output acquired by performing the FFT on the second symbol.

The correlation calculator 722-3 may calculate the correlation between the output result acquired by performing the time offset compensation through the compensator 722-2 and the output result acquired by not performing the time offset compensation.

According to the embodiment of the present disclosure, if the compensator 722-2 performs the time offset compensation on the output acquired by performing the FFT on the first symbol and the output acquired by performing the FFT on the second symbol, the correlation calculator 722-3 may also calculate the correlation between the outputs on which the time offset compensation is performed.

The accumulator 722-4 may accumulate the correlation calculated by the correlation circulator 722-3. The frequency offset estimator 722 may estimate the frequency offset using the correlation accumulated by the accumulator 722-4.

Meanwhile, the symbol acquirer 721 and the frequency offset estimator 722 may be realized by hardware such as a separate module included in the controller 720 and software such as a program and an application.

For example, the controller 720 may further include a flash memory or other nonvolatile memories. The nonvolatile memory may store a program for performing the functions of the symbol acquirer 721 and the frequency offset estimator 722, respectively. The CPU of the controller 720 may copy the above-described programs stored in the nonvolatile memory into the RAM, and then execute the copied programs to perform the functions of each component as described above.

Meanwhile, the above-described estimation of the frequency offset may be performed in the modem included in the base station 700. In this case, the symbol acquirer 721 and the frequency offset estimator 722 may also be implemented as components of the modem.

Figure 7D:

According to the embodiment of the present disclosure, if the first symbol and the second symbol are symbols acquired from the reference signal (RS) received by the base station 700, as shown in FIG. 7D, the frequency offset estimator 722 may further include a channel estimator 722-5.

Even at this time, the frequency offset estimator 722 may be realized by hardware such as a separate module included in the controller 720 or software such as a program and an application, or may be a component of a modem included in the base station 700.

If the first symbol and the second symbol acquired by the acquirer 721 are symbols acquired from the reference signal, the converter 722-1 may perform the fast Fourier transform (FFT) on the first symbol and the second symbol. The compensator 722-2 may perform the time offset compensation on at least one of an output acquired by performing the FFT on the first symbol and an output acquired by performing the FFT on the second symbol.

The channel estimator 722-5 may perform the channel estimation on the outputs by performing the FFT on the first symbol and the second symbol on which the time offset compensation is performed or not performed to remove the noise.

The correlation calculator 722-3 may calculate the correlation between the outputs whose noise is removed by the channel estimator 722-5. The accumulator 722-4 may accumulate the correlation calculated by the correlation circulator 722-3. The frequency offset estimator 722 may estimate the frequency offset using the correlation accumulated by the accumulator 722-4.

Figure 7E:
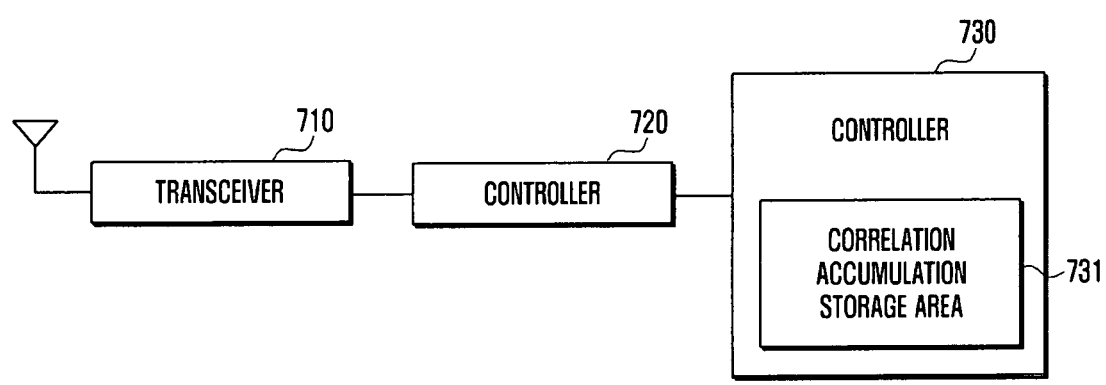

Meanwhile, as illustrated in FIG. 7E, the base station 700 may further include a memory 730 that includes a correlation accumulation storage area capable of storing the accumulated correlation.

As described above, the base station may use the cyclic prefix (CP) inserted into the symbol to easily estimate the frequency offset between the base station and the terminal.

Meanwhile, the components of the base station described above may be implemented by software. For example, the controller of the base station may further include a flash memory or other nonvolatile memories. A program for performing each function of the base station may be stored in the nonvolatile memory.

Further, the controller of the base station may be implemented in a form including a CPU and a random access memory (RAM). The CPU of the controller may copy the above-described programs stored in the nonvolatile memory into the RAM, and then execute the copied programs to perform the functions of the base station as described above.

The controller serves to control the base station. The controller may be interchangeably used as the same meaning as a central processing unit, a microprocessor, a processor, an operating system, or the like. Further, the controller of the base station may be implemented as a system-on-a-chip or a system on chip (SOC or SoC) along with other function sections such as the transceiver included in the base station.

Meanwhile, the method for estimating a frequency offset of the base station according to various exemplary embodiments of the present disclosure as described above may be stored in a non-transitory readable medium while being coded in software. The non-transitory readable medium may be used while being equipped in various apparatuses.

The non-transitory computer readable medium is not a medium that stores data for a while, such as a register, a cache, and a memory, but means a medium that semi-permanently stores data and is readable by a device. In detail, the non-transitory computer readable medium may be a CD, a DVD, a hard disc, a Blueray disc, an USB, a memory card, an ROM, etc.

Although exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the disclosure as disclosed in the accompanying claims. These modifications should also be understood to fall within the scope of the present disclosure.

The invention claimed is:

1. A method for estimating a frequency offset of a base station, comprising:
  obtaining a first symbol from which a cyclic prefix (CP) symbol of a received symbol is removed;
  obtaining a second symbol from which data having a length corresponding to the CP symbol is removed at an end opposite to an end in which the CP symbol of the received symbol; and
  estimating the frequency offset based on a correlation between the first symbol and the second symbol in frequency domain.

2. The method of claim 1, wherein the estimating of the frequency offset further includes:
  setting the remaining data symbols other than the CP symbol of the second symbol to be 0 when the first symbol and the second symbol are obtained from a symbol of a data signal; and
  estimating the frequency offset based on the first symbol and the second symbol in which the remaining data symbols other than the CP symbol is set to be 0, and
  wherein the first symbol and the second symbol are obtained from the symbol of the data signal received by the base station.

3. The method of claim 1, wherein the estimating of the frequency offset further includes:
  performing fast Fourier transform (FFT) on the first symbol and the second symbol;
  performing time offset compensation on at least one of an output acquired by performing the FFT on the first symbol and an output acquired by performing the FFT on the second symbol;

determining a correlation between an output result obtained by performing the time offset compensation and an output result obtained by not performing the time offset compensation;

accumulating the determined correlation; and estimating the frequency offset based on the accumulated correlation.

4. The method of claim 1, wherein the estimating of the frequency offset further includes:

performing fast Fourier transform (FFT) on the first symbol and the second symbol;

performing time offset compensation on at least one of an output obtained by performing the FFT on the first symbol and an output obtained by performing the FFT on the second symbol;

removing noise by performing channel estimation on the outputs obtained by performing or not performing the time offset compensation when the first symbol and the second symbol are symbols obtained from a reference signal (RS) received by the base station;

determining the correlation of the output results of the first symbol and the second symbol from which the noise is removed;

accumulating the determined correlation; and estimating the frequency offset based on the accumulated correlation.

5. A base station, comprising:

a transceiver configured to transmit/receive a symbol; and a controller configured to estimate a frequency offset based on a correlation between a first symbol from which a cyclic prefix (CP) symbol of the received symbol received through the transceiver is removed, and a second symbol from which data having a length corresponding to the CP of the received symbol is removed at an end opposite to an end in which the CP of the received symbol, in frequency domain.

6. The base station of claim 5, wherein the controller further configured to obtain the first symbol and the second symbol from a symbol of a data signal received through the transceiver, and estimate the frequency offset based on the first symbol and the second symbol.

7. The base station of claim 6, wherein when the first symbol and the second symbol are obtained from the symbol of the data signal, and wherein the controller further configured to:

set the remaining data symbols other than a CP symbol of the second symbol to be 0, and estimate the frequency offset based on the first symbol and the second symbol in which the remaining data symbols other than the CP symbol are set to be 0.

8. The base station of claim 5, wherein the controller further configured to:

perform a fast Fourier transform (FFT) on the first symbol and the second symbol, and perform time offset compensation on at least one of an output obtained by performing the FFT on the first symbol and an output obtained by performing the FFT on the second symbol.

9. The base station of claim 8, wherein the controller further configured to:

determine a correlation between an output result obtained by performing the time offset compensation and an output result obtained by not performing the time offset compensation, accumulate the determined correlation, and estimate the frequency offset based on the accumulated correlation.

10. The base station of claim 5, wherein the controller further configured to:

perform fast Fourier transform (FFT) on the first symbol and the second symbol, perform time offset compensation on at least one of an output obtained by performing the FFT on the first symbol and an output obtained by performing the FFT on the second symbol, when the first symbol and the second symbol are symbols obtained from a reference signal (RS) received by the base station, remove noise by performing channel estimation on the outputs obtained by performing or not performing the time offset compensation, determine a correlation between the output results of the first symbol and the second symbol from which the noise is removed, accumulate the determined correlation, and estimate frequency offset based on the accumulated correlation.

11. A modem apparatus of a base station, comprising:

a symbol obtainer configured to:

obtain a first symbol from which a cyclic prefix (CP) symbol of a received symbol is removed, and obtain a second symbol from which data having a length corresponding to the CP is removed at an end opposite to an end in which the CP of the received symbol; and a frequency offset estimator configured to estimate the frequency offset based on a correlation between the first symbol and the second symbol in frequency domain.

12. The modem apparatus of claim 11, wherein the symbol obtainer configured to:

obtain the first symbol and the second symbol from a symbol of a data signal received through the transceiver.

13. The modem apparatus of claim 11, wherein the frequency offset estimator further configured to:

set the remaining data symbols other than a CP symbol of the second symbol to be 0 when the first symbol and the second symbol are obtained from the symbol of the data signal, and estimate the frequency offset based on the first symbol and the second symbol in which the remaining data symbols other than the CP symbol are set to be 0.

14. The modem apparatus of claim 11, wherein the frequency offset estimator further includes:

a converter configured to perform fast Fourier transform (FFT) on the first symbol and the second symbol;

a compensator configured to perform time offset compensation on at least one of an output obtained by performing the FFT on the first symbol and an output obtained by performing the FFT on the second symbol;

a correlation controller configured to determine a correlation between an output result obtained by performing the time offset compensation and an output result obtained by not performing the time offset compensation by the compensator; and an accumulator configured to accumulate the determined correlation, and the offset estimator configured to estimate the frequency offset based on the accumulated correlation.

15. The modem apparatus of claim 11, further comprising:

a converter configured to perform fast Fourier transform (FFT) on the first symbol and the second symbol;

a compensator configured to perform time offset compensation on at least one of an output obtained by performing the FFT on the first symbol and an output obtained by performing the FFT on the second symbol;

a channel estimator configured to remove noise by performing channel estimation on the outputs obtained by performing or not performing the time offset compensation when the first symbol and the second symbol are obtained from a reference signal (RS) received by the base station;

a correlation controller configured to determine the correlation between the output results of the first symbol and the second symbol from which the noise is removed; and an accumulator configured to accumulate the calculated correlation, and the offset estimator configured to estimate the frequency offset based on the accumulated correlation.

* * * * *